(12) United States Patent
Huang

(10) Patent No.: US 12,164,399 B2
(45) Date of Patent: Dec. 10, 2024

(54) GPU STRESS TEST WITH DYNAMIC LOADS

(71) Applicant: Apollo Autonomous Driving USA LLC, Sunnyvale, CA (US)

(72) Inventor: Congshi Huang, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 33 days.

(21) Appl. No.: 18/069,635

(22) Filed: Dec. 21, 2022

(65) Prior Publication Data

US 2024/0211363 A1 Jun. 27, 2024

(51) Int. Cl.
G06F 11/00 (2006.01)
G06F 11/263 (2006.01)
G06F 11/273 (2006.01)

(52) U.S. Cl.
CPC .......... G06F 11/263 (2013.01); G06F 11/273 (2013.01)

(58) Field of Classification Search
CPC .. G06F 11/263; G06F 11/273; G06F 11/0739; G06F 11/3013; G06F 11/3031
See application file for complete search history.

(56) References Cited

U.S. PATENT DOCUMENTS

| | | | |
|---|---|---|---|
| 2014/0223236 A1* | 8/2014 | Hao | G06F 11/273 714/31 |
| 2017/0177458 A1* | 6/2017 | Viggers | G06F 11/263 |
| 2019/0095302 A1* | 3/2019 | Wang | G06F 11/0739 |
| 2019/0171538 A1* | 6/2019 | Gulati | G06T 1/20 |
| 2023/0236942 A1* | 7/2023 | Xu | G06F 11/26 714/724 |
| 2023/0286531 A1* | 9/2023 | Laverne | B60W 50/10 |

* cited by examiner

*Primary Examiner* — Joseph D Manoskey
(74) *Attorney, Agent, or Firm* — WOMBLE BOND DICKINSON (US) LLP (57) ABSTRACT

A data processing system of an autonomous driving vehicle (ADV) may include a central processing unit (CPU) and a graphics processing unit (GPU). The CPU may be configured to monitor a behavior of a graphics processing unit (GPU), operate the GPU to perform a randomly controlled operation using a random number generator, operate the GPU to perform an idle period, and operate the GPU to repeat the randomly controlled operation. The idle period may be performed between each repetition of the randomly controlled operation, and each repetition may utilize the random number generator.

20 Claims, 10 Drawing Sheets

GPU STRESS TEST WITH DYNAMIC LOADS

TECHNICAL FIELD

Embodiments of the present disclosure relate generally to operating autonomous driving vehicles. More particularly, embodiments of the disclosure relate to testing a graphic processing unit (GPU) with dynamic loads.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances. Graphics processing technology provides benefits in the world of computing. A graphics processing unit (GPU) may be used in various fields such as gaming, content creation, machine learning, and more. A GPU may be designed for parallel processing and GPU is used in a wide range of applications, including graphics and video rendering. A GPU may be used to perform various tasks related to autonomous driving such as processing one or more images to perceive the environment around the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In traditional systems, testing of a GPU is run at a full test power, or at a fixed duty cycle. Such a test, however, does not accurately depict a real use case. Further, such a test lacks the check of dynamic performance of GPU and supporting components of the overall system such as the system's power supply.

Aspects described in the present disclosure improve upon testing of traditional systems. GPU stress test may be performed with dynamic load to simulate a real use case of the GPU more accurately. Embodiments of the disclosure may test and verify the dynamic performance of a GPU and the overall system, including components like the power supply that support the GPU.

According to some embodiments, a method may be performed by a central processing unit (CPU) to perform stress testing on a graphics processing unit (GPU) using dynamic loading. The method may include monitoring, by the CPU, a behavior of a GPU, as it undergoes testing. The CPU may operate the GPU to perform a randomly controlled operation using a random number generator. The CPU may operate the GPU to perform an idle period. During the idle period, the GPU is not performing an operation (e.g., a test operation). The CPU may operate the GPU to repeat the randomly controlled operation using the random number generator for each repetition. The CPU may command the GPU to be idle between each repetition of the randomly controlled operations. To operate the GPU under test, the CPU may provide commands or command data to the GPU (e.g., over a communication bus).

In some examples, the CPU may perform the test in response to a request or a command line option that enables or initiates dynamic loading of the GPU. The GPU may use a random number generator (e.g., a Pseudorandom binary sequence (PRBS) generator) to determine the dimensions of a matrix. In some examples, the CPU may use the random number generator to determine the contents of the matrix too.

In some examples, the CPU may use the random number generator to determine how many repetitions (e.g., cycles) will be performed during the test, or how long the test will be.

In some examples, the test may include one or more periods of idle time, when the GPU is not performing a task. The duration of the idle time may also be determined with the random number generator.

Figure 1:
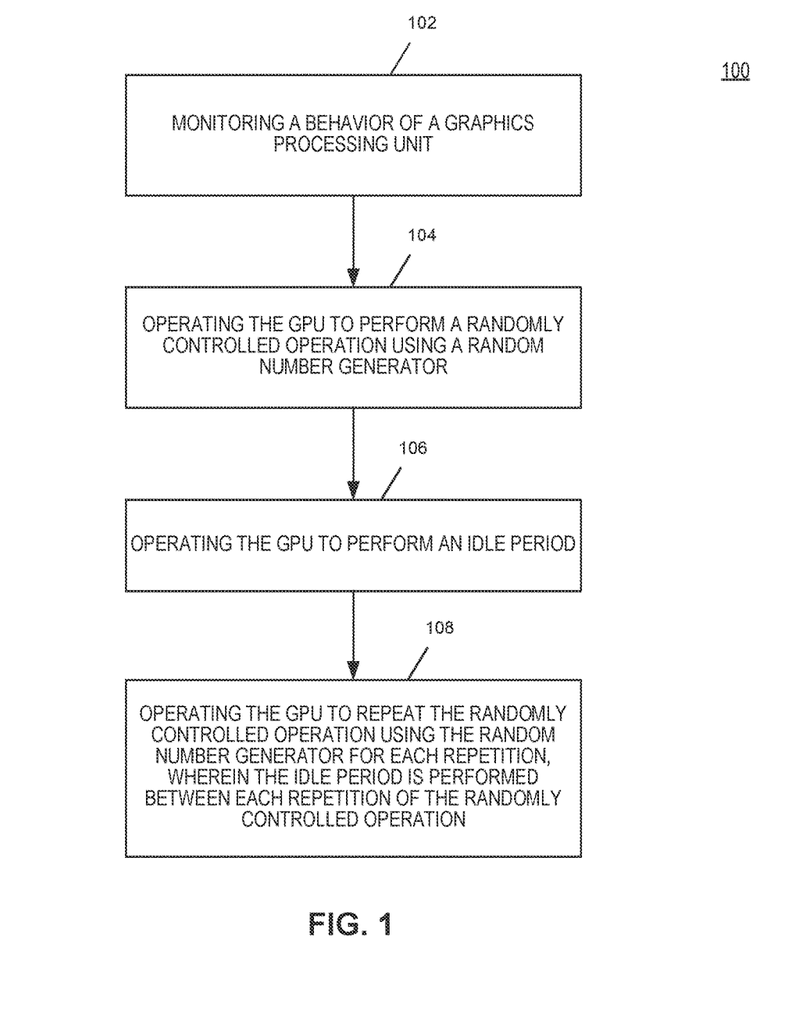
FIG. 1 shows an example process for testing of a GPU according to one embodiment.

FIG. 1 shows an example process for testing of a GPU according to one embodiment. The process 100 may be performed by a processing device. For example, the process 100 may be performed by a central processing unit (CPU) of a data processing system. The process 100 may test operation of a GPU under dynamic loads.

At block 102, the process includes monitoring a behavior of a graphics processing unit (GPU). At block 104, the process includes operating the GPU to perform a randomly controlled operation using a random number generator. At block 106, the process includes operating the GPU to perform an idle period. At block 108, the process includes operating the GPU to repeat the randomly controlled operation using the random number generator for each repetition, wherein the idle period is performed between each repetition of the randomly controlled operation.

In some examples, operating the GPU to perform the randomly controlled operation (e.g., at block 104 and block 108) comprises generating a random value and generating dimensions of a first matrix and a second matrix based on the random value, for each repetition of the randomly controlled operation. For example, the CPU may generate one or more random numbers with a random number generator, and determine the dimension of the matrix (e.g., an N×M matrix) using the one or more random numbers. The CPU may send the first matrix and the second matrix from the CPU to the GPU, and operate the GPU to combine the first matrix and the second matrix to determine a third matrix. This may be done for each repetition of the randomly controlled operation, such that each repetition may operate the GPU to perform the matrix combination operation with matrices of varying sizes. In some examples, combining the first matrix and the second matrix may include multiplying the first matrix with the second matrix. Additionally, or alternatively, the CPU may operate the GPU to perform other matrix operations (e.g., addition, subtraction, etc.). The CPU may be communicatively coupled to the GPU to provide one or more commands to the GPU.

In some embodiments, the process includes using the random number generator to generate a number of repetitions of the randomly controlled operation. For example, the random number generator may produce a random value 'x'. In response, the CPU may perform 'x' number of loading and idling the GPU for the test.

In some embodiments, operating the GPU to perform the idle period includes using the random number generator to determine a length of the idle period for each repetition of the idle period. For example, at block 106, the CPU may randomly generate a value 'y' and rest the GPU for a duration of 'y'. In a subsequent repetition (e.g., at block 108), the CPU may generate a second value 'z' and rest the GPU for a duration of 'z' during that repetition.

In some examples, monitoring the behavior of the GPU includes comparing a result of the randomly controlled operation of the GPU to a second result determined by the CPU. For example, the CPU may generate a first matrix and a second matrix, and operate the GPU to perform an operation on them (e.g., combining them). The CPU may also combine the first and the second matrix, and then compare its result with that of the GPU to determine if the GPU performed the combining operation successfully.

In some examples, monitoring the behavior of the GPU includes obtaining a calculation rate of the GPU. For example, the CPU may count how long it takes for the GPU to perform the randomly controlled operation, or count how many instructions the GPU executes over a given period, or otherwise obtain a calculation rate of the GPU.

In some examples, monitoring the behavior of the GPU includes monitoring a responsiveness of the GPU. For example, the CPU may passively listen to the GPU on a bus (e.g., a heartbeat) or actively poll the GPU (e.g., for a result to the randomly controlled operation, or for a response), to determine if the GPU remains responsive. This may be performed at different intervals of the testing (e.g., during one or more repetitions).

The CPU and the GPU may be integrated to a common printed circuit board assembly (PCBA) and be communicatively coupled to each other over a communication bus. The PCBA may be integral to one or more data processing systems that may be integrated in an autonomous driving vehicle (ADV) to perform autonomous driving operations discussed herein. For example, the CPU may be configured to obtain one or more images captured by a sensor of the ADV and apply the GPU to process the one or more images for perception of an environment of the ADV. The process 100 may be performed in response to a request to perform diagnostics on the ADV or on the PCBA.

Figure 2:
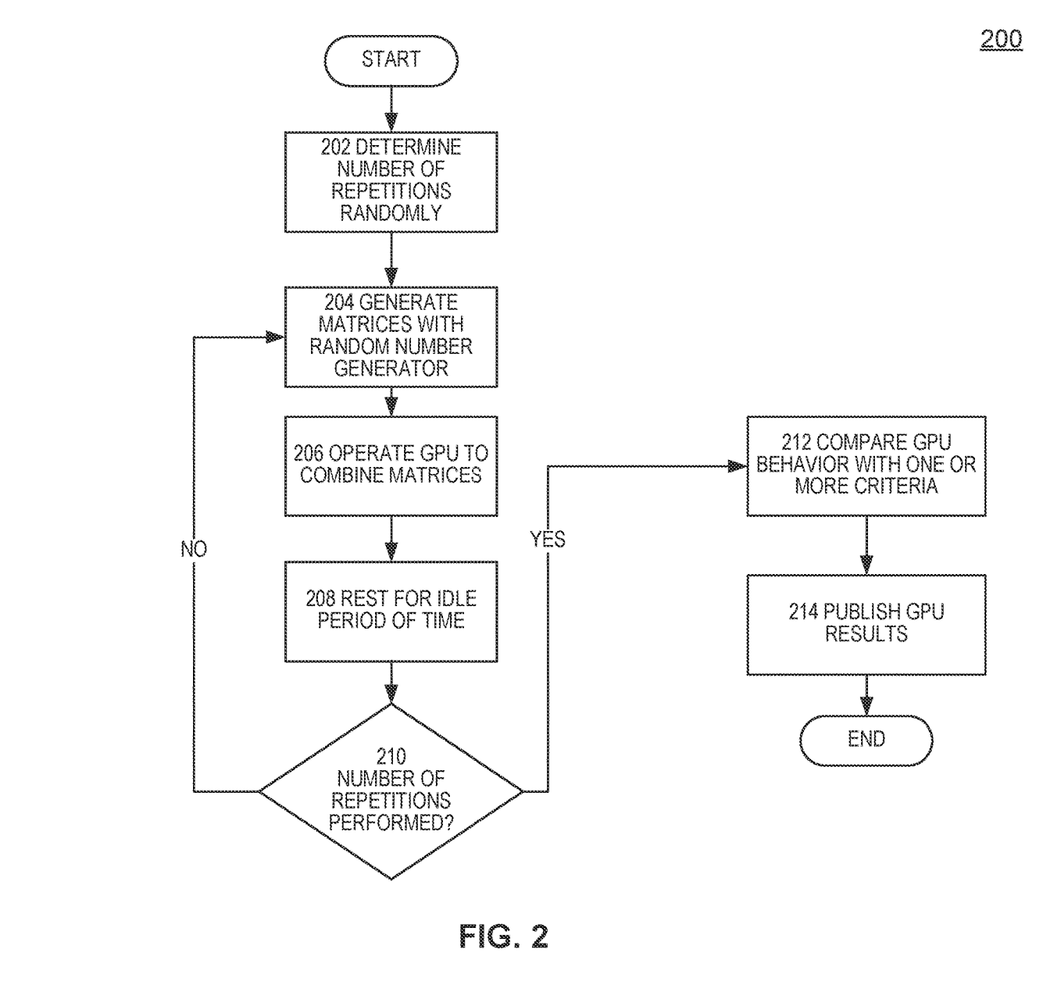
FIG. 2 shows an example flow chart for testing of a GPU according to one embodiment.

FIG. 2 shows a flow chart of an example workflow for testing of a GPU according to one embodiment. The example workflow 200 may illustrate features that are included in process 100. The workflow may be performed by a CPU, such as one that is integrated with a GPU.

At block 202, a CPU may determine a number of repetitions (e.g., load cycles) that is to be performed by the GPU. This number may be determined using a random number generator.

At block 204, the CPU may generate a plurality of matrices with a random number generator. The random number generator may be used to generate random values which then may serve as the dimensions of the matrices, or serve as an input to a function that determines the dimensions of the matrices.

At block 206, the CPU may operate the GPU to combine the first matrix and the second matrix. For example, the CPU may send the GPU the first matrix and the second matrix, and instruct the GPU to multiply them and report the results back to the CPU.

At block 208, the CPU may rest for an idle period of time. In some examples, the duration of this rest period may be determined based on a randomly generated value. During the idle period, the CPU sends no commands to the GPU, so the GPU is idle (e.g., does not perform an operation). The CPU may keep count of how many cycles loading and resting (e.g., block 206 and 208) is performed for a given test.

At block 210, if the number of repetitions that has been performed satisfies the number determined at block 202, the CPU may proceed to block 212. If not, the CPU may repeat block 204, 206 and 208. At each cycle, new random numbers may be generated to generate a first matrix and second matrix with different dimensions from the previous repetition (at block 204), or to rest the GPU for a different duration (at block 208) from the previous repetition. This variation may more accurately simulate operating conditions of the CPU and GPU system when used in an autonomous driving vehicle setting.

At block 212, if the repetitions have all been performed, the CPU may compare the observed GPU behavior with one or more criteria. For example, the CPU may compare the results of the GPU operation (at block 206) to its own results of the same operation, to verify that the CPU performed the operation with success. Additionally, or alternatively, the CPU may obtain a calculation rate of the GPU and verify whether that calculation rate satisfies a threshold (e.g., a performance threshold). This may be expressed in terms of speed (e.g., instructions performed over time) or duration (e.g., how long it took for the GPU to perform each operation). Additionally, or alternatively, the CPU may verify that the GPU is still responsive (e.g., by polling or listening for a heartbeat).

At block 214, the CPU may publish the results of the GPU testing. In some examples, the CPU may store the results such as the observed behavior of the GPU, or whether the GPU satisfied the one or more criteria, in a log or report (e.g., in non-volatile computer memory). The CPU may also share this information with other systems (e.g., a server, to a display, etc.).

In some examples, the workflow 200 may be performed in a factory setting to test the CPU and GPU system. Additionally, or alternatively, the workflow may be performed as a diagnostics tool when the CPU and GPU system is integral to an ADV.

Figure 3:
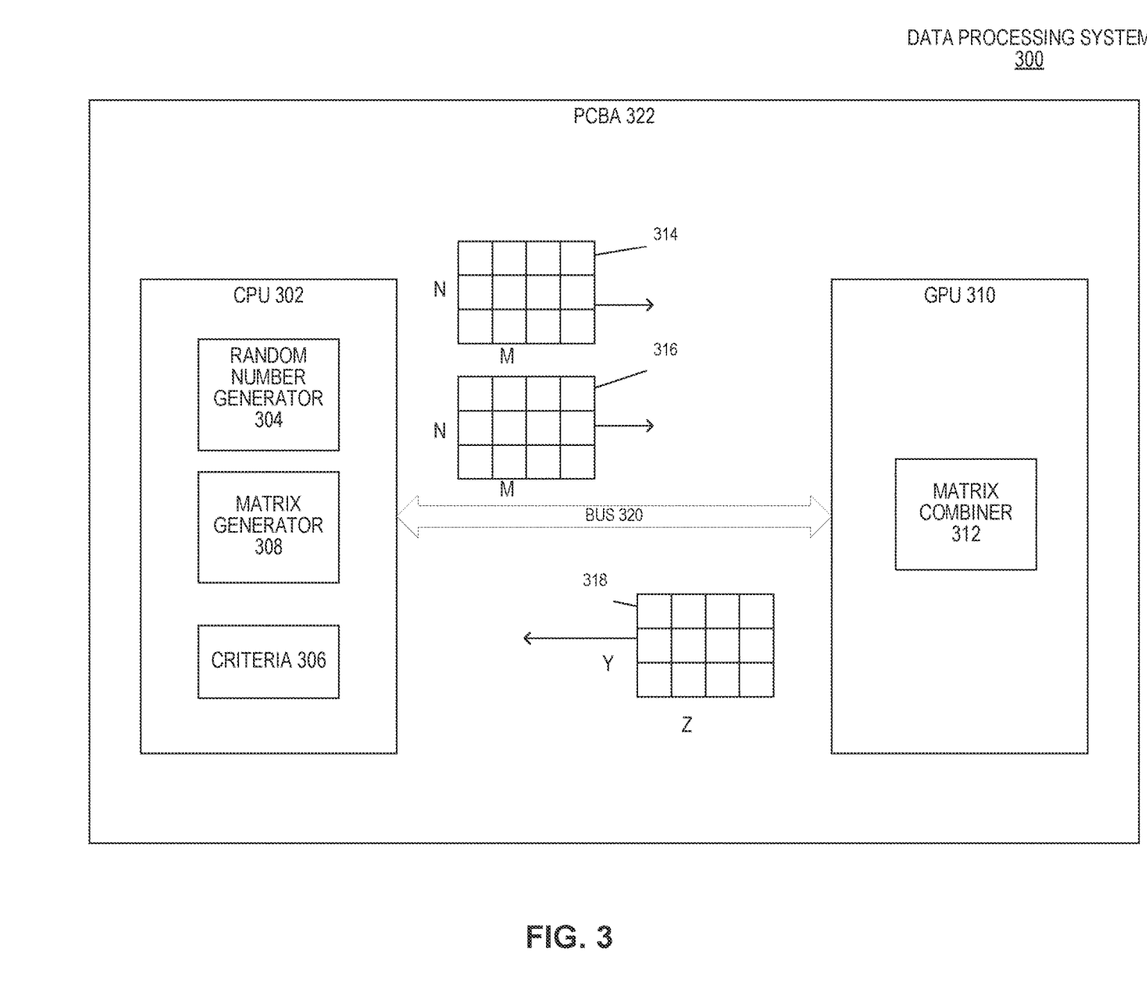
FIG. 3 shows an example system with a CPU and GPU according to one embodiment.

FIG. 3 shows an example system with a CPU and GPU according to one embodiment. A data processing system 300 may include a CPU 302 and a GPU 310. The CPU 302 and GPU 310 may be integral to a PCBA 322. The CPU 302 and GPU 310 may be communicatively connected over a bus 320. The bus 320 may include a digital communication bus using an existing or new protocol. In some examples, the bus 320 may include one or more communication buses.

In some examples, the CPU 302 and GPU 310 may each be implemented as system on chips (SOCs), which may be connected to traces on PCBA 322 through one or more standard mounting techniques. The PCBA 322 may include additional components not shown such as memory devices (e.g., computer-readable memory), one or more power supplies that provide power to components on the PCBA 322, filtering components, connectors, and other passive or active electronic components.

CPU 302 may include a random number generator 304 to generate one or more random values that may be used to test GPU 310. In some examples, the random number generator 304 includes a pseudorandom binary sequence (PRBS) generator. A PRBS may be referred to as a binary sequence that is generated with a deterministic algorithm. The sequence is difficult to predict and exhibits statistical behavior like a random sequence.

The CPU 302 may include a matrix generator that uses the one or more random values from the random number generator to generate a first matrix 314 and a second matrix 316. The matrix generator may use the one or more random values as the dimensions (N and M) of the first matrix and the second matrix, or they may be used as a basis (e.g., an input) to a formula to determine the dimensions. For example, the CPU 302 may limit the dimensions at a max value or apply the random values as a multiplier to a default value, or both, to determine the dimensions of the matrices 314 and 316. In some examples, the dimensions of the matrices 314 and 316 may be the same. In other examples, the CPU 302 may generate the matrices 314 and 316 with different dimensions. Each matrix (e.g., 314 and 316) may include a rectangular array or table of numbers, symbols, or expressions, arranged in rows and columns. A matrix 314 may have N×M positions that are arranged in M columns in N rows.

The CPU 302 may populate each position of each matrix with a value and send them to CPU 310 over bus 320. In some examples, the CPU 302 may use the random number generator 304 to populate the matrices. In other examples, the CPU 302 may populate the random number generator 304 with one or more default values. The CPU 302 may specify, over bus 320, what kind of combining operation to perform (e.g., multiplication, addition, subtraction, division, etc.).

The GPU 310 may include a matrix combiner 312. The matrix combiner 312 may receive the matrices 314 and 316, and combine them to form a third matrix 318. The third matrix may have dimensions Y and Z that may be different from those of the first and second matrix, or the same, depending on the combining operation performed. When complete, the matrix combiner 312 may send the result of its operation (e.g., the third matrix 318) back to the CPU 302. The CPU 302 may verify the result against one or more criteria 306. For example, the CPU 302 may also determine the result of the same combining operation performed by GPU 310 with the first matrix 314 and the second matrix 316, and then verify whether its results match that of the GPU 310. If the results do not match, CPU 302 may determine that the GPU 310 has not satisfied the one or more criteria 306. If they do match, the CPU 302 may determine that the one or more criteria 306 are satisfied by the GPU 310.

The criteria 306 may include other criteria such as whether or not the GPU 310 is responsive, how fast the GPU 310 is performing its operation, etc.

After sending instructions to the GPU 310 to perform the operation, the CPU may cease sending commands to the GPU 310 for an idle period of time. In some embodiments, this idle period of time is determined from one or more values from random number generator 304. In other examples, the idle period of time may be fixed, or follow a default pattern.

After the idle period is over, the CPU 302 may send a second set of matrices to the GPU 310 that are again generated based on the random number generator 304. This second set may have different dimensions than the prior repetition. The process may be repeated, as discussed, for a default or random number of repetitions.

Figure 4:
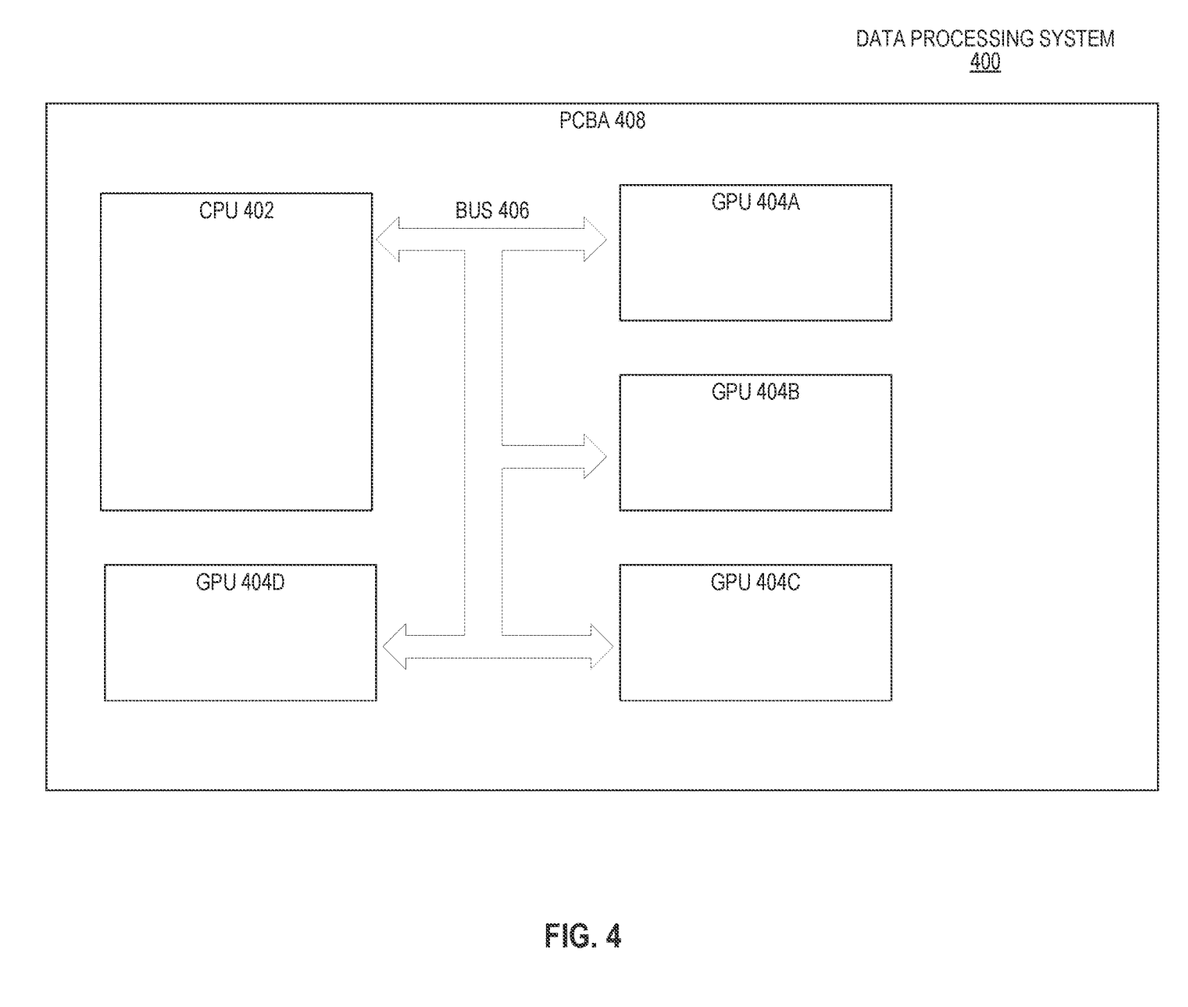
FIG. 4 shows an example system with multiple GPUs according to one embodiment.

FIG. 4 shows an example system with multiple GPUs according to one embodiment. A data processing system 400 may include a CPU 402 that is communicatively coupled to a plurality of GPUs 404A-404D over one or more communication buses 406. CPU 402 may include features described with respect to CPU 302, or perform operations described in terms of a process or workflow in other examples. Similarly, each of GPUs 404A-404D may include features of GPU 310 or perform operations describe in terms of process or workflow in other examples. The CPU 402 and GPUs 404A-404D may be integral to a common PCBA 408, or one or more PCBAs 408.

The CPU 402 may be configured to test each GPU that is integral to data processing system 400, such as GPU 404A, 404B, 404C, and 404D. For example, as described in other sections, CPU 402 may operate each GPU to perform a randomly controlled operation. The number of repetitions or total time of the test may vary from one GPU to another, and from one test to another. The CPU may publish the results of each GPU as a whole or individually.

During operation of an ADV, the CPU may apportion various image processing tasks to each of the GPUs, such as those related to perception (e.g., computer vision). When the system is installed on the ADV, the CPU may perform self-diagnostics on its onboard GPUs to verify proper operation.

Figure 5:
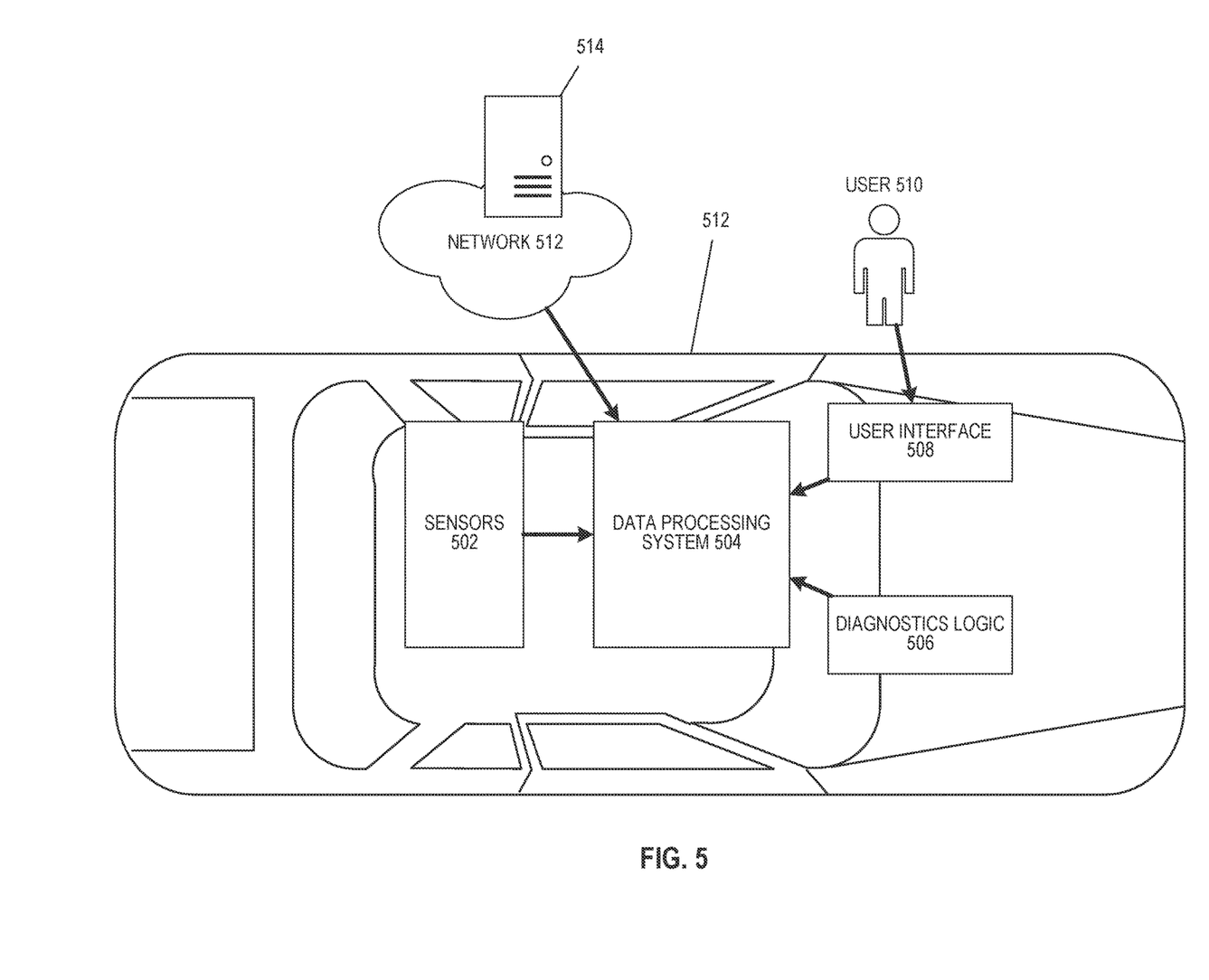
FIG. 5 shows an example autonomous driving vehicle with GPU diagnostics according to one embodiment.

FIG. 5 shows an example autonomous driving vehicle (ADV) with GPU diagnostics according to one embodiment. An ADV 512 may include sensors 502 that sense the environment around the ADV. Sensors 502 may correspond to one or more sensors of sensor system 615, as described in other sections.

Data processing system 504 may obtain one or more images obtained from the sensors 502. Data processing system 504 may correspond with data processing system 300 or 400. Data processing system 504 may perform operations describe with respect to FIG. 1 or FIG. 2.

Data processing system 504 may initiate testing of its onboard GPUs in response to a request (e.g., a diagnostics request). In some examples, a user 510 may operate a user interface 508 to send a request to data processing system 504 to perform the diagnostics. The data processing system 504 may publish the results of the test (e.g., 'GPU is OK', or 'GPU failed') to the user 510 through a display, or a notification, or other publication means.

In some examples, the request may be received through a remote system 514 over a network 512. For example, a remote system 514 may detect an anomaly with ADV 512, or otherwise determine to perform routine maintenance on the ADV 512.

Additionally, or alternatively, the ADV 512 may include diagnostics logic 506 that may request that the data processing system 504 perform its GPU diagnostics. The diagnostics logic 506 may observe the ADV 512 and, if one or more conditions of the ADV 512 are observed (e.g., based on the objects that are wrongly perceived or wrongly not perceived around the ADV), the diagnostics logic may send a request to the data processing system 504 to perform its GPU testing.

In some examples, the request to the data processing system 504 may include whether or not to use randomly controlled operations to test the GPUs. In some cases, the request may specify to what degree randomly controlled operations are to be used. For example, the request may specify to use a fixed or default pattern for the idle durations and number of repetitions, but to use randomly generated matrices for the GPUs to combine. In another example, the request may specify to user randomly generated idle durations as well as randomly generated matrices, but a for a fixed or max duration of testing time. The data processing system 504 may be configured to test its GPUs based on the specified fields of the request.

Figure 6:
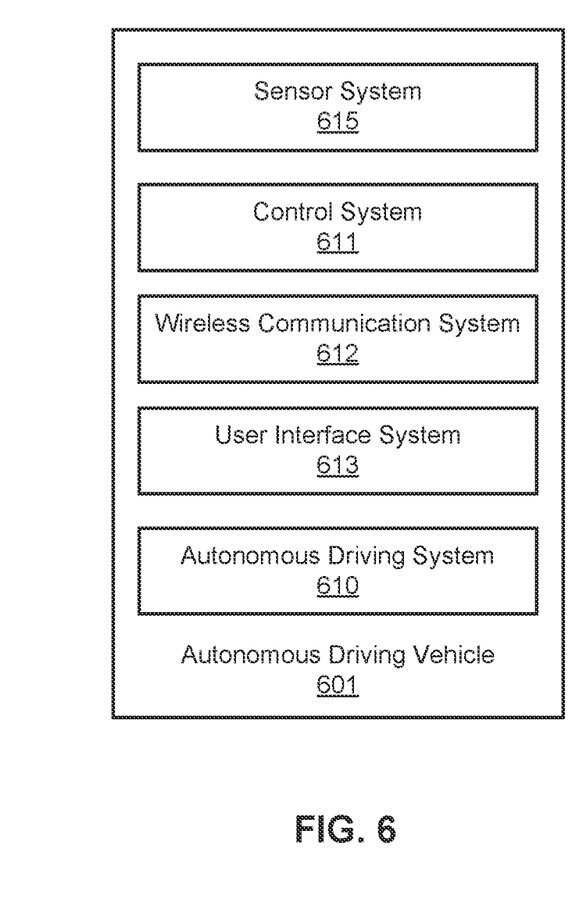
FIG. 6 is a block diagram illustrating an autonomous driving vehicle according to one embodiment.

FIG. 6 is a block diagram illustrating an autonomous driving vehicle according to one embodiment of the disclosure. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, autonomous driving system (ADS) 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or ADS 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
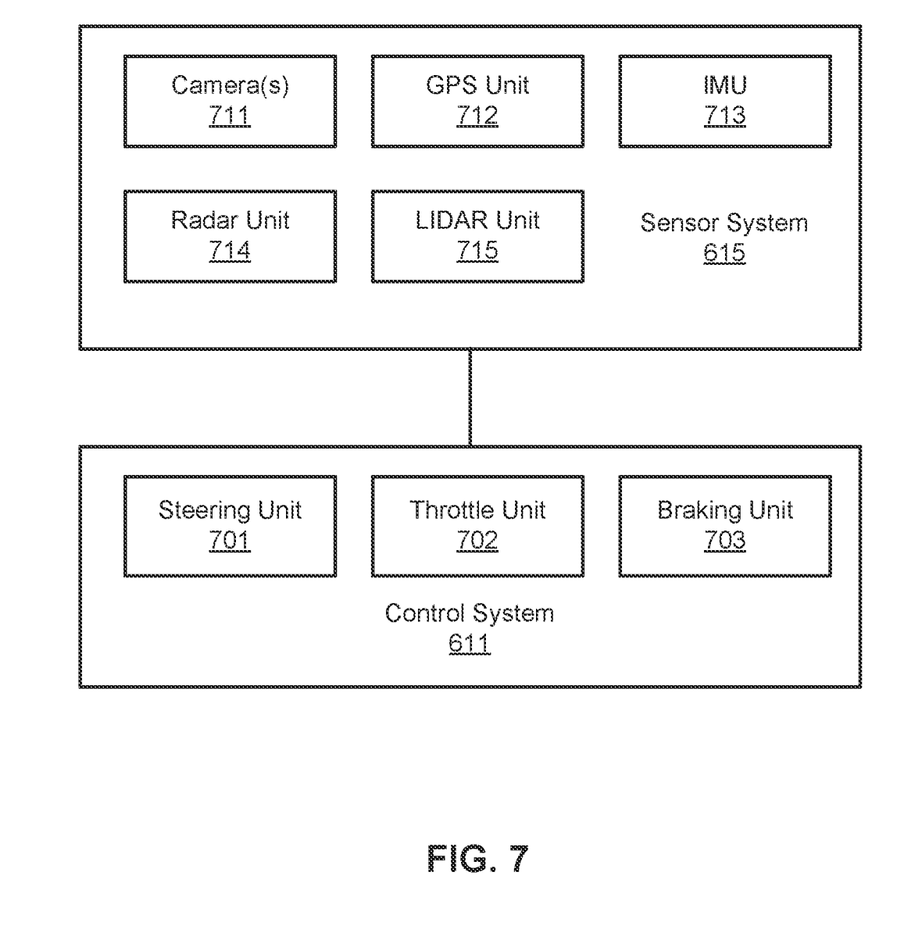
FIG. 7 is a block diagram illustrating an example of an autonomous driving vehicle according to one embodiment.

Referring to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using Wi-Fi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by ADS 610, especially when operating in an autonomous driving mode. ADS 610 includes the necessary hardware (e.g., processor (s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, ADS 610 may be integrated with vehicle control system 611.

For example, a user as a passenger may specify a starting location and a destination of a trip, for example, via a user interface. ADS 610 obtains the trip related data. For example, ADS 610 may obtain location and route data from an MPOI server. The location server provides location services and the MPOI server provides map services and the POIs of certain locations. Alternatively, such location and MPOI information may be cached locally in a persistent storage device of ADS 610.

While autonomous driving vehicle 601 is moving along the route, ADS 610 may also obtain real-time traffic information from a traffic information system or server (TIS). Note that the servers may be operated by a third-party entity. Alternatively, the functionalities of the servers may be integrated with ADS 610. Based on the real-time traffic information, MPOI information, and location information, as well as real-time local environment data detected or sensed by sensor system 615 (e.g., obstacles, objects, nearby vehicles), ADS 610 can plan an optimal route and drive vehicle 601, for example, via control system 611, according to the planned route to reach the specified destination safely and efficiently.

Figure 8:
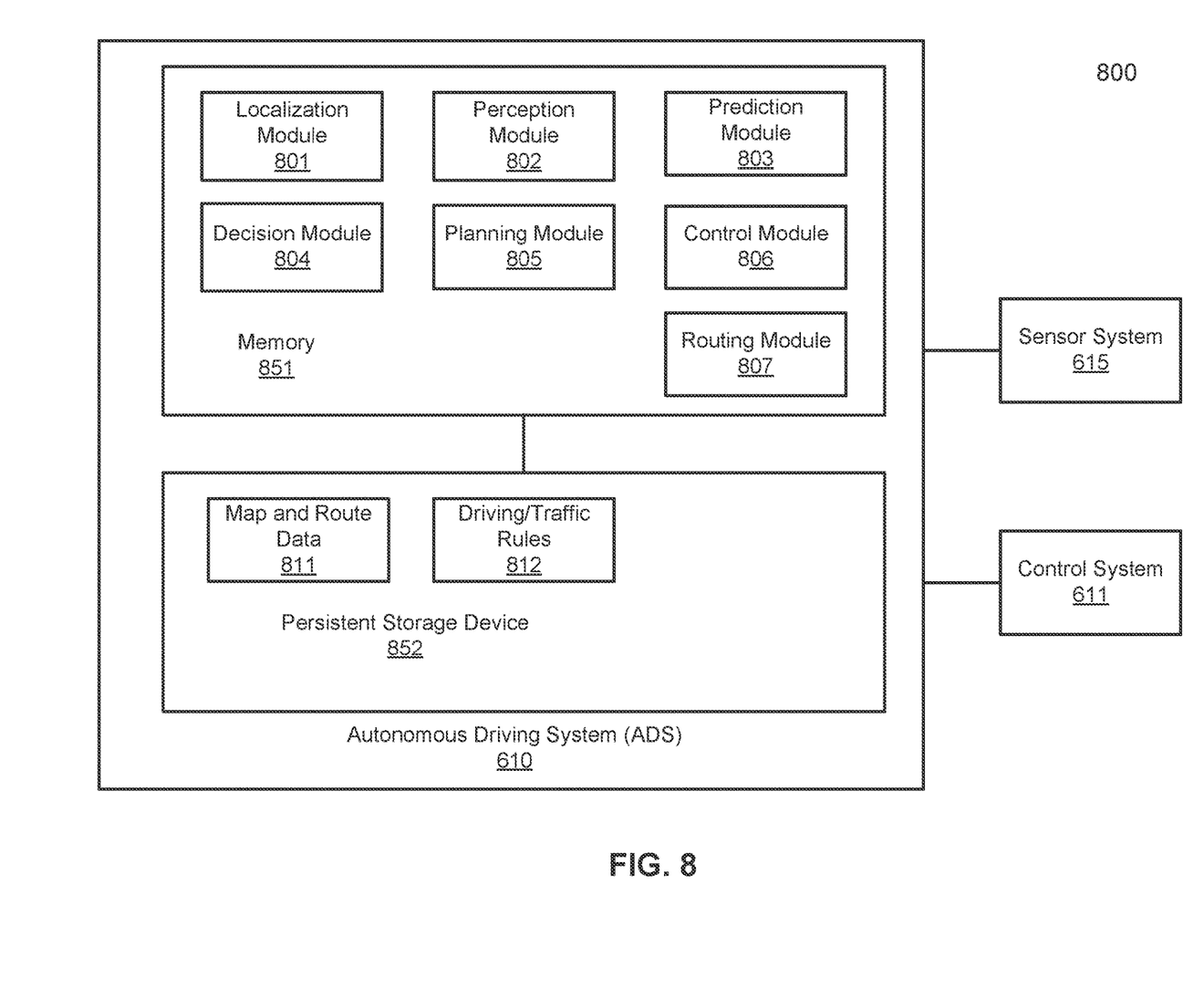
FIG. 8 is a block diagram illustrating an example of an autonomous driving system used with an autonomous driving vehicle according to one embodiment.

FIG. 8 is a block diagram illustrating an example of an autonomous driving system used with an autonomous driving vehicle according to one embodiment. System 800 may be implemented as a part of autonomous driving vehicle 601 of FIG. 6 including, but is not limited to, ADS 610, control system 611, and sensor system 615. Referring to FIG. 8, ADS 610 includes, but is not limited to, localization module 801, perception module 802, prediction module 803, decision module 804, planning module 805, control module 806, and routing module 807. Any of the modules described, including the perception module 802, may be implemented using the data processing system described (e.g., in FIG. 3 or FIG. 4).

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module such as a data processing system described in other sections.

Localization module 801 determines a current location of autonomous driving vehicle 601 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 601, such as map and route data 811, to obtain the trip related data. For example, localization module 801 may obtain location and route data from a location server and a map and POI (MPOI) server. A location server provides location services and an MPOI server provides map services and the POIs of certain locations, which may be cached as part of map and route data 811. While autonomous driving vehicle 601 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection.

If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 601 would move in a next moving cycle (e.g., next route/path segment). For example, the planning and control data may instruct vehicle 601 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Figure 9A:
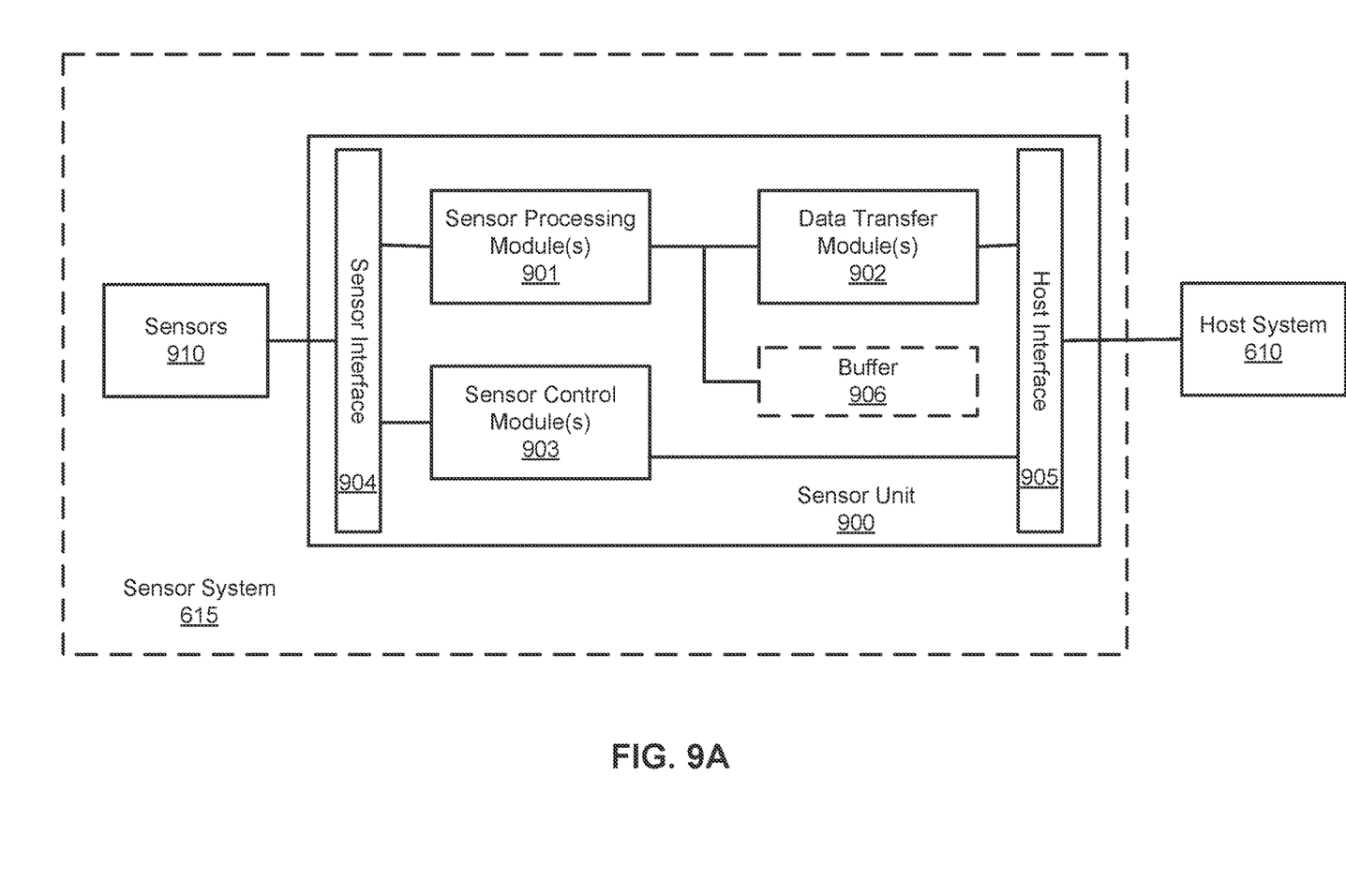
FIGS. 9A and 9B are block diagrams illustrating an example of a sensor unit according to one embodiment.

FIG. 9A is a block diagram illustrating an example of a sensor system according to one embodiment of the invention. Referring to FIG. 9A, sensor system 615 includes a number of sensors 910 and a sensor unit 900 coupled to host system 610. Host system 610 represents a planning and control system as described above, which may include at least some of the modules as shown in FIG. 8. Sensor unit 900 may be implemented in a form of an FPGA device or an ASIC (application specific integrated circuit) device. In one embodiment, sensor unit 900 includes, amongst others, one or more sensor data processing modules 901 (also simply referred to as sensor processing modules), data transfer modules 902, and sensor control modules or logic 903. Modules 901-903 can communicate with sensors 910 via a sensor interface 904 and communicate with host system 610 via host interface 905. Optionally, an internal or external buffer 906 may be utilized for buffering the data for processing.

In one embodiment, for the receiving path or upstream direction, sensor processing module 901 is configured to receive sensor data from a sensor via sensor interface 904 and process the sensor data (e.g., format conversion, error checking), which may be temporarily stored in buffer 906. Data transfer module 902 is configured to transfer the processed data to host system 610 using a communication protocol compatible with host interface 905. Similarly, for the transmitting path or downstream direction, data transfer module 902 is configured to receive data or commands from host system 610. The data is then processed by sensor processing module 901 to a format that is compatible with the corresponding sensor. The processed data is then transmitted to the sensor.

In one embodiment, sensor control module or logic 903 is configured to control certain operations of sensors 910, such as, for example, timing of activation of capturing sensor data, in response to commands received from host system (e.g., perception module 802) via host interface 905. Host system 610 can configure sensors 910 to capture sensor data in a collaborative and/or synchronized manner, such that the sensor data can be utilized to perceive a driving environment surrounding the vehicle at any point in time.

Sensor interface 904 can include one or more of Ethernet, USB (universal serial bus), LTE (long term evolution) or cellular, Wi-Fi, GPS, camera, CAN, serial (e.g., universal asynchronous receiver transmitter or UART), SIM (subscriber identification module) card, and other general purpose input/output (GPIO) interfaces. Host interface 905 may be any high speed or high bandwidth interface such as PCIe (peripheral component interconnect or PCI express) interface. Sensors 910 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 900. The serial interface such as UART can be coupled with a console system for debug purposes.

Note that sensors 910 can be any kind of sensors and provided by various vendors or suppliers. Sensor processing module 901 is configured to handle different types of sensors and their respective data formats and communication protocols. According to one embodiment, each of sensors 910 is associated with a specific channel for processing sensor data and transferring the processed sensor data between host system 610 and the corresponding sensor. Each channel includes a specific sensor processing module and a specific data transfer module that have been configured or programmed to handle the corresponding sensor data and protocol, as shown in FIG. 9B.

Figure 9B:
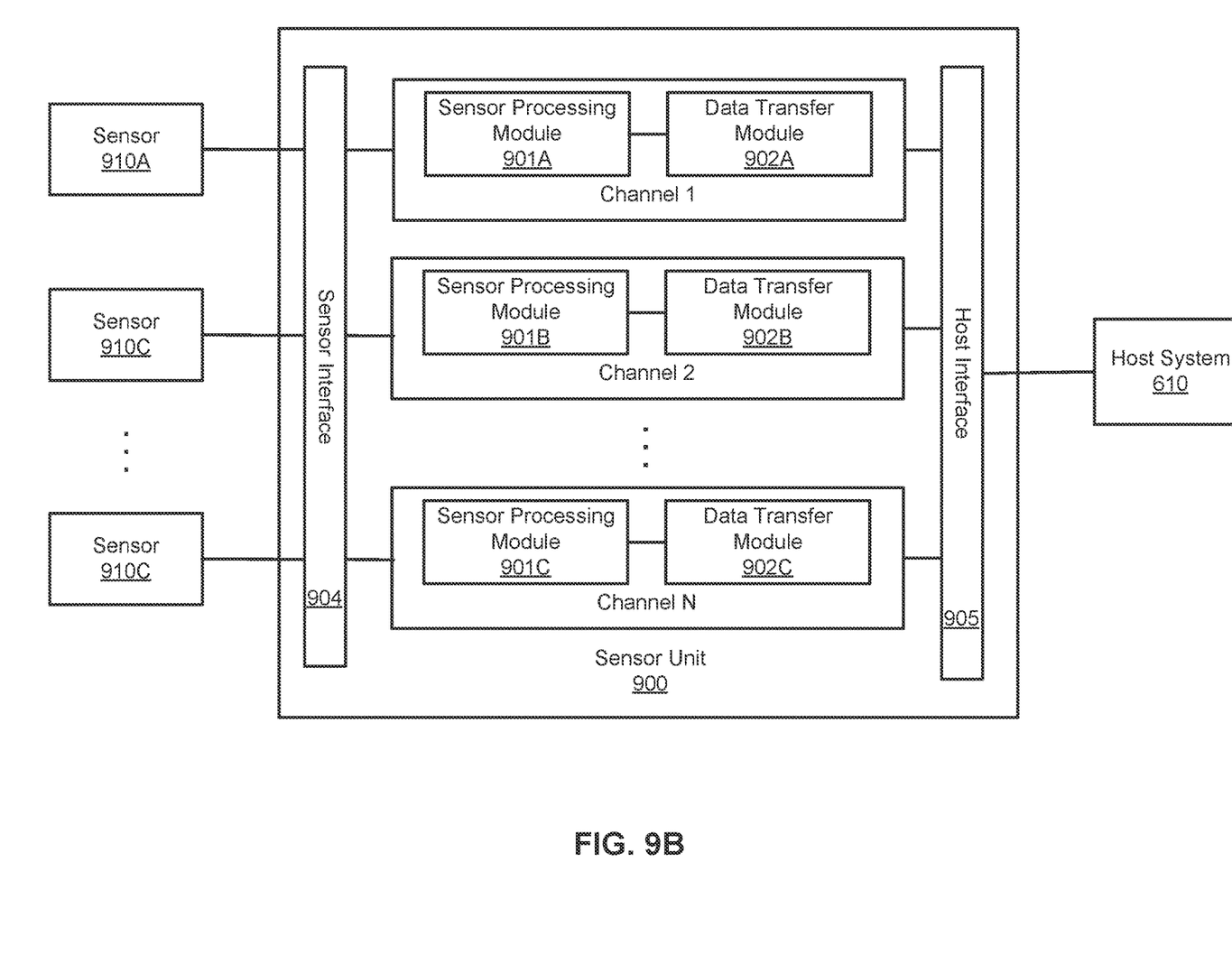

Referring to FIG. 9B, sensor processing modules 901A-901C are specifically configured to process sensor data obtained from sensors 910A-910C respectively. Note that sensors 910A-910C may the same or different types of sensors. Sensor processing modules 901A-901C can be configured (e.g., software configurable) to handle different sensor processes for different types of sensors. For example, if sensor 910A is a camera, processing module 901A can be figured to handle pixel processing operations on the specific pixel data representing an image captured by camera 910A. Similarly, if sensor 910A is a LIDAR device, processing module 901A is configured to process LIDAR data specifically. That is, according to one embodiment, dependent upon the specific type of a particular sensor, its corresponding processing module can be configured to process the corresponding sensor data using a specific process or method corresponding to the type of sensor data.

Similarly, data transfer modules 902A-902C can be configured to operate in different modes, as different kinds of sensor data may be in different size or sensitivities that require different speed or timing requirement. According to one embodiment, each of data transfer modules 902A-902C can be configured to operate in one of a low latency mode, a high bandwidth mode, and a memory mode (also referred to as a fixed memory mode).

When operating in a low latency mode, according to one embodiment, a data transfer module (e.g., data transfer module 902) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 902) is configured to accumulate the sensor data received from a sensor up to a predetermined amount, but is still within the bandwidth the connection between the data transfer module and the host system 610. The accumulated sensor data is then transferred to the host system 610 in a batch that maximum the bandwidth of the connection between the data transfer module and host system 610. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 610, similar to a shared memory page. Examples of the sensor data to be transferred using memory mode include system status data such as temperature, fans speed, etc. Host system 610 may include one or more data processing systems such as 300 or 400, as described in other sections.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method performed by a central processing unit (CPU), comprising:
   monitoring a behavior of a graphics processing unit (GPU);
   operating the GPU to perform a randomly controlled operation using a random number generator;
   operating the GPU to perform an idle period; and
   operating the GPU to repeat the randomly controlled operation using the random number generator for each repetition, wherein the idle period is performed between each repetition of the randomly controlled operation, and wherein operating the GPU to perform the randomly controlled operation includes generating a random value and generating dimensions of at least a first matrix based on the random value for each repetition of the randomly controlled operation.

2. The method of claim 1, wherein operating the GPU to perform the randomly controlled operation further comprises generating dimensions of a second matrix based on the random value, for each repetition of the randomly controlled operation.

3. The method of claim 2, wherein operating the GPU to perform the randomly controlled operation further comprises sending the first matrix and the second matrix from the CPU to the GPU, for the GPU to combine the first matrix and the second matrix to determine a third matrix, for each repetition of the randomly controlled operation.

4. The method of claim 1, further comprising using the random number generator to generate a number of repetitions of the randomly controlled operation.

5. The method of claim 1, wherein operating the GPU to perform the idle period includes, using the random number generator to determine a length of the idle period for each repetition of the idle period.

6. The method of claim 1, wherein monitoring the behavior of the GPU includes comparing a result of the randomly controlled operation of the GPU to a second result determined by the CPU, for each repetition of the randomly controlled operation.

7. The method of claim 1, wherein monitoring the behavior of the GPU includes obtaining a calculation rate of the GPU.

8. The method of claim 1, wherein monitoring the behavior of the GPU includes monitoring a responsiveness of the GPU.

9. The method of claim 1, wherein the CPU and the GPU are integrated to a common printed circuit board assembly (PCBA) of an autonomous driving vehicle (ADV) and the method is performed in response to a request to perform diagnostics on the PCBA.

10. The method of claim 9, wherein the CPU is configured to obtain one or more images captured by a sensor of the ADV, and to apply the GPU to process the one or more images for perception of an environment of the ADV.

11. A non-transitory machine-readable medium having instructions stored therein, which when executed by a central processing unit (CPU), cause the CPU to perform operations, the operations comprising:
    monitoring a behavior of a graphics processing unit (GPU);
    operating the GPU to perform a randomly controlled operation using a random number generator;
    operating the GPU to perform an idle period; and
    operating the GPU to repeat the randomly controlled operation using the random number generator for each repetition, wherein the idle period is performed between each repetition of the randomly controlled operation, and wherein operating the GPU to perform the randomly controlled operation includes generating a random value and generating dimensions of at least a first matrix based on the random value for each repetition of the randomly controlled operation.

12. The non-transitory machine-readable medium of claim 11, wherein operating the GPU to perform the randomly controlled operation further comprises generating dimensions of a second matrix based on the random value, for each repetition of the randomly controlled operation.

13. The non-transitory machine-readable medium of claim 12, wherein operating the GPU to perform the randomly controlled operation further comprises sending the first matrix and the second matrix from the CPU to the GPU, for the GPU to combine the first matrix and the second matrix to determine a third matrix, for each repetition of the randomly controlled operation.

14. The non-transitory machine-readable medium of claim 11, wherein the operations further comprise using the random number generator to generate a number of repetitions of the randomly controlled operation.

15. The non-transitory machine-readable medium of claim 11, wherein operating the GPU to perform the idle period includes, using the random number generator to determine a length of the idle period for each repetition of the idle period.

16. A data processing system, comprising:
a central processing unit (CPU);
a graphics processing unit (GPU); and
a memory coupled to the CPU to store instructions, which when executed by the CPU, cause the CPU to perform operations, the operations including:
monitoring a behavior of the GPU;
operating the GPU to perform a randomly controlled operation using a random number generator;
operating the GPU to perform an idle period; and
operating the GPU to repeat the randomly controlled operation using the random number generator for each repetition, wherein the idle period is performed between each repetition of the randomly controlled operation, and wherein operating the GPU to perform the randomly controlled operation includes generating a random value and generating dimensions of at least a first matrix based on the random value for each repetition of the randomly controlled operation.

17. The data processing system of claim 16, wherein operating the GPU to perform the randomly controlled operation further comprises generating dimensions of a second matrix based on the random value, for each repetition of the randomly controlled operation.

18. The data processing system of claim 17, wherein operating the GPU to perform the randomly controlled operation further comprises sending the first matrix and the second matrix from the CPU to the GPU, for the GPU to combine the first matrix and the second matrix to determine a third matrix, for each repetition of the randomly controlled operation.

19. The data processing system of claim 16, wherein the operations further comprise using the random number generator to generate a number of repetitions of the randomly controlled operation.

20. The data processing system of claim 16, wherein operating the GPU to perform the idle period includes, using the random number generator to determine a length of the idle period for each repetition of the idle period.

* * * * *